(12) United States Patent
Miyake

(10) Patent No.: US 11,915,578 B2
(45) Date of Patent: Feb. 27, 2024

(54) BEACON DEVICE, POSITIONING SYSTEM, BEACON SIGNAL TRANSMISSION METHOD

(71) Applicant: JVCKENWOOD Corporation, Yokohama (JP)

(72) Inventor: Fumiaki Miyake, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/932,718

(22) Filed: Sep. 16, 2022

(65) Prior Publication Data

US 2023/0196902 A1    Jun. 22, 2023

(30) Foreign Application Priority Data

Dec. 20, 2021 (JP) ................ 2021-205999
Dec. 20, 2021 (JP) ................ 2021-206000

(51) Int. Cl.
*G08B 25/10* (2006.01)
*H04W 4/029* (2018.01)
*G08B 25/14* (2006.01)

(52) U.S. Cl.
CPC ............ *G08B 25/10* (2013.01); *G08B 25/14* (2013.01); *H04W 4/029* (2018.02)

(58) Field of Classification Search
CPC ....... G08B 25/10; G08B 25/14; H04W 4/029; H04W 4/90
See application file for complete search history.

(56) References Cited

U.S. PATENT DOCUMENTS

| 3,922,678 | A | * | 11/1975 | Frenkel | G01S 5/02521 455/526 |
| 4,494,119 | A | * | 1/1985 | Wimbush | G01S 5/14 342/465 |
| 5,982,813 | A | * | 11/1999 | Dutta | H04W 52/267 370/468 |
| 8,461,963 | B2 | * | 6/2013 | Ko | H04L 63/102 340/5.74 |
| 9,363,765 | B2 | * | 6/2016 | Kazmi | H04W 52/367 |
| 10,070,248 | B2 | * | 9/2018 | Elkehag | G08B 21/0272 |
| 10,159,042 | B2 | * | 12/2018 | Matsuo | H04W 72/0446 |
| 2005/0048988 | A1 | * | 3/2005 | Gentle | H04W 76/50 455/456.1 |

FOREIGN PATENT DOCUMENTS

JP    2015126410 A    7/2015

* cited by examiner

*Primary Examiner* — John A Tweel, Jr.
(74) *Attorney, Agent, or Firm* — Shih IP Law Group, PLLC

(57) ABSTRACT

A beacon device includes a transmitter, a receiver, and a controller. The transmitter transmits a beacon signal. The receiver is capable of receiving an emergency signal from a wireless device. The controller changes the setting of the transmission of a beacon signal from the transmitter based on whether or not the receiver has received an emergency signal. The transmitter transmits a beacon signal according to the setting made by the controller.

10 Claims, 6 Drawing Sheets

FIG. 4

| EMERGENCY SIGNAL | STATE INFORMATION | TRANSMISSION POWER | TRANSMISSION INTERVAL |
|---|---|---|---|
| NOT RECEIVED | — | FIRST TRANSMISSION POWER | FIRST TRANSMISSION INTERVAL |
| RECEIVED | FIRST STATE | | THIRD TRANSMISSION INTERVAL |
| | SECOND STATE | SECOND TRANSMISSION POWER | SECOND TRANSMISSION INTERVAL |

130

BEACON DEVICE, POSITIONING SYSTEM, BEACON SIGNAL TRANSMISSION METHOD

This application is based upon and claims the benefit of priority from the prior Japanese Patent Application No. 2021-205999, filed on Dec. 20, 2021, and the prior Japanese Patent Application No. 2021-206000, filed on Dec. 20, 2021, the entire contents of which is incorporated herein by reference.

BACKGROUND OF THE INVENTION

1. Field

The present invention relates to a positioning technology and particularly to a beacon device, a positioning system, and a beacon signal transmission method.

2. Description of the Related Art

Beacon devices transmit beacon signals at predetermined intervals. If a beacon signal is transmitted from a beacon device when no wireless device capable of receiving beacon signals is in the vicinity of the beacon device, the beacon device consumes power uselessly. Therefore, the beacon device includes a proximity sensor and adjusts a beacon signal transmission interval according to whether or not the presence of a wireless device is detected by a proximity sensor (e.g., Patent Document 1).

[Patent Document 1] Japanese Patent Application Publication No. 2015-126410

Beacon signals are used to locate a subject indoors. When a wireless device carried by a subject receives a beacon signal from a beacon device, the wireless device transmits the reception result to a positioning server. The positioning server determines the position of the wireless device based on the reception result. In order to facilitate installation of such beacon devices, beacon devices are driven by batteries. In general, beacon devices transmit beacon signals at a fixed cycle, and the battery runtime depends on a beacon signal transmission cycle. For example, the battery runtime is several months if the transmission occurs about once per second and is several years if the transmission occurs about once every several tens of seconds. Considering maintainability of the beacon device, a longer transmission cycle is preferable. However, a shorter transmission cycle is preferable, e.g., when the wireless device detects an emergency state since the latest positioning is required.

SUMMARY OF THE INVENTION

A beacon device according to one aspect of the present embodiment includes: a transmitter that transmits a beacon signal; a receiver that is capable of receiving an emergency signal from a wireless device; an analyzer that analyzes the emergency signal when the receiver receives the emergency signal; and a controller that controls the transmission of a beacon signal from the transmitter based on the result of the analysis. The controller switches at least one of the beacon signal transmission interval and the beacon signal transmission power based on the result of the analysis from the analyzer.

Another aspect of the present embodiment relates to a beacon signal transmission method. This method includes: transmitting a beacon signal; when receiving an emergency signal from a wireless device, analyzing the emergency signal; and controlling the transmission of a beacon signal based on the result of the analysis. In the controlling, at least one of a beacon signal transmission interval and a beacon signal transmission power is switched based on the result of the analysis.

Yet another aspect of the present embodiment relates to a beacon device. This device includes: a transmitter that transmits a beacon signal; a receiver that is capable of receiving an emergency signal from a wireless device; and a controller that controls the transmission of a beacon signal from the transmitter. The controller intermittently transmits a beacon signal for positioning when the receiver does not receive an emergency signal, and when the receiver receives an emergency signal, the controller intermittently transmits a beacon signal for emergency state notification that includes information regarding the wireless device that has transmitted the received emergency signal in addition to a beacon signal for positioning.

Optional combinations of the aforementioned constituting elements and implementations of the present embodiments in the form of methods, apparatuses, systems, recording mediums, and computer programs may also be practiced as additional modes of the present embodiments.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 4 is a diagram illustrating a data structure of a table stored in a controller of FIG. 2;

DETAILED DESCRIPTION OF THE PREFERRED EMBODIMENT

The invention will now be described by reference to the preferred embodiments. This does not intend to limit the scope of the present invention, but to exemplify the invention.

First Exemplary Embodiment

A brief description of the present invention will be given first before a specific description thereof is given. The exemplary embodiment of the present invention relates to a positioning system including a plurality of beacon devices, a wireless device, and a positioning server. Each of the plurality of beacon devices is installed at a known location and transmits beacon signals at predetermined intervals. For example, the wireless device is a wireless terminal that transmits, upon receiving a beacon signal, the reception result to the positioning server. The positioning server determines the position of the wireless device based on the reception result. For convenience of installation, the beacon devices use batteries such as button batteries or dry cell batteries. Also, the beacon devices can transmit beacon signals at intervals of several hundred milliseconds to several tens of seconds. If the transmission interval is shortened, real-time performance is enhanced, but the battery runtime of the beacon devices is shortened. If the transmission interval is lengthened, the battery runtime of the beacon devices is increased, but the real-time performance is reduced. Thus, it is required to increase the battery runtime of the beacon devices while increasing the real-time performance.

The beacon devices according to the present exemplary embodiment have a receiving function in addition to a transmitting function. The wireless device transmits an emergency signal upon detecting an emergency state. Upon receiving an emergency signal, the beacon devices shorten the beacon signal transmission interval or increase the beacon signal transmission power. This makes it easier for the latest beacon signal to be received by the wireless device and improves real-time performance. On the other hand, when not receiving an emergency signal, the beacon devices do not shorten the beacon signal transmission interval and do not increase the beacon signal transmission power. This reduces the power consumption of the beacon devices and increases the battery runtime of the beacon devices.

Figure 1:
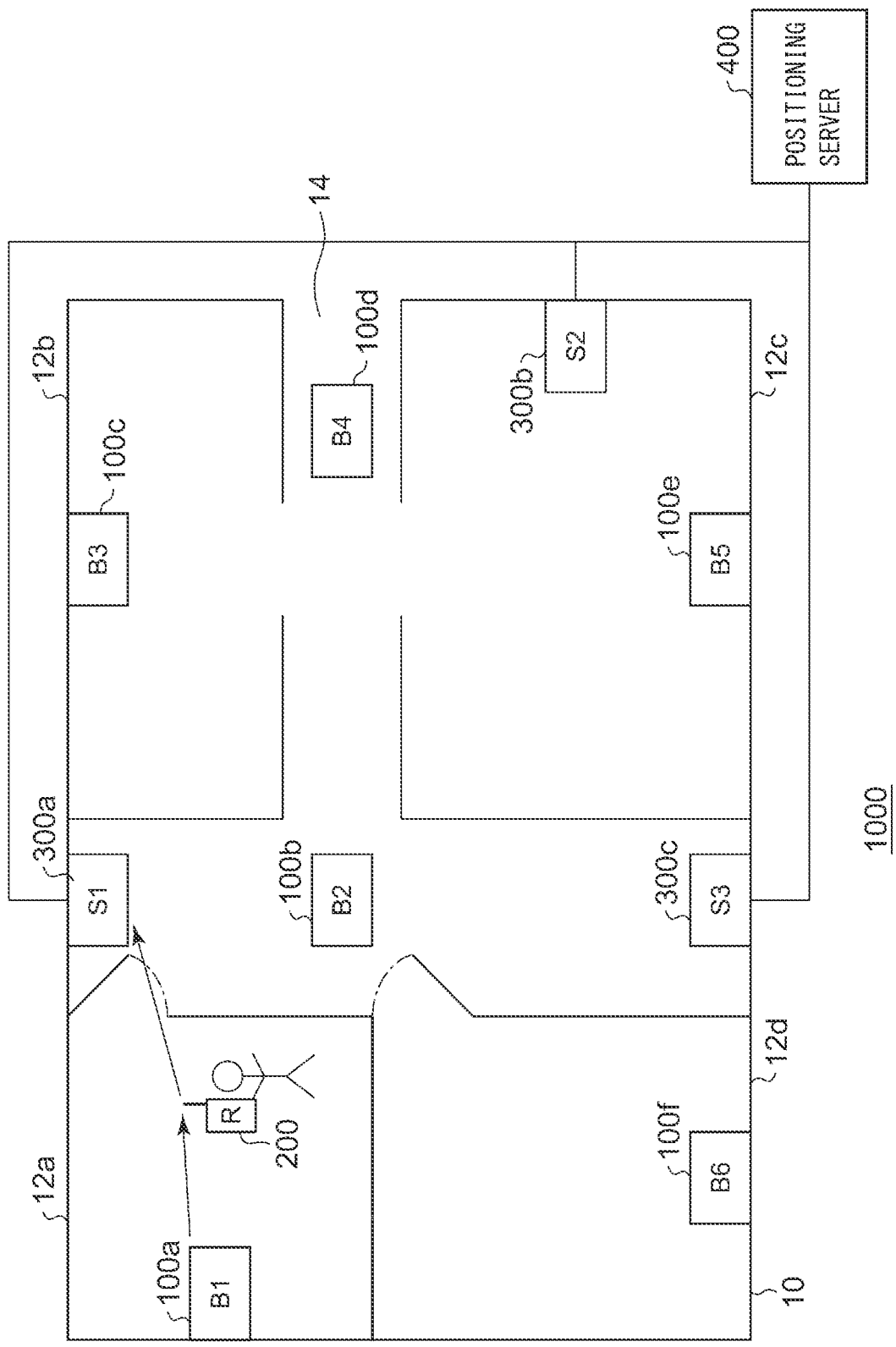
FIG. 1 is a diagram illustrating the configuration of a positioning system according to the first exemplary embodiment.

FIG. 1 illustrates the configuration of a positioning system 1000. The positioning system 1000 includes a first beacon device 100a through a sixth beacon device 100f, which are collectively referred to as beacon devices 100, a wireless device 200, a first sensor 300a through a third sensor 300c, which are collectively referred to as sensors 300, and a positioning server 400. The number of beacon devices 100 in the positioning system 1000 is not limited to six. The number of wireless devices 200 is not limited to one, and the number of sensors 300 is not limited to three. The positioning system 1000 locates the position of the wireless device 200 present in a facility 10 such as a residence, an office, a store, etc. The facility 10 includes a first room 12a through a fourth room 12d, which are collectively referred to as rooms 12, and a hallway 14. The shape of the facility 10 is not limited to that of FIG. 1.

Each beacon device 100 is installed at a different location within the facility 10, for example, a room 12 or the hallway 14. Each beacon device 100 is battery-powered and transmits beacon signals at predetermined intervals. For the transmission of the beacon signals, for example, a short-range wireless communication system such as Bluetooth (registered trademark) is used. The beacon signals include identification information for identifying the beacon device 100 that is the transmission source (hereinafter referred to as "beacon device ID").

The wireless device 200 is a wireless terminal carried by the subject and includes a wireless communication function using a short-range wireless communication system. The wireless device 200 receives a beacon signal from a beacon device 100 installed nearby. The wireless device 200 transmits the reception result of the beacon signal to a nearby sensor 300. The reception result includes, for example, the beacon device ID included in the beacon signal, the reception power value at the time of the reception of the beacon signal, and identification information for identifying the wireless device 200 (hereinafter referred to as "wireless device ID").

The sensor 300 also includes a wireless communication function using a short-range wireless communication system and receives the reception result from the wireless device 200. The sensor 300 transmits the reception result to the positioning server 400. The positioning server 400 receives the reception result from the sensor 300. The positioning server 400 estimates the position of the wireless device 200 based on the reception result. Since the reception result includes the beacon ID, the positioning server 400 determines which beacon device 100 the wireless device 200 is located near based on the beacon ID. A publicly-known technology may be used for the processes of the positioning server 400.

Figure 2:
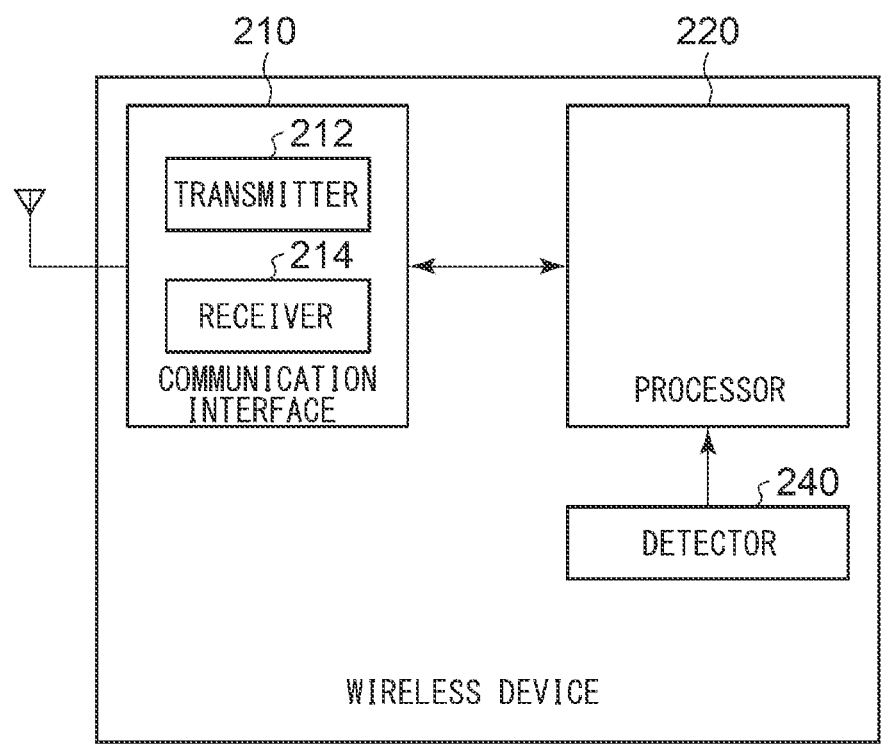
FIG. 2 is a diagram illustrating the configuration of a wireless device of FIG. 1.
Figure 3:
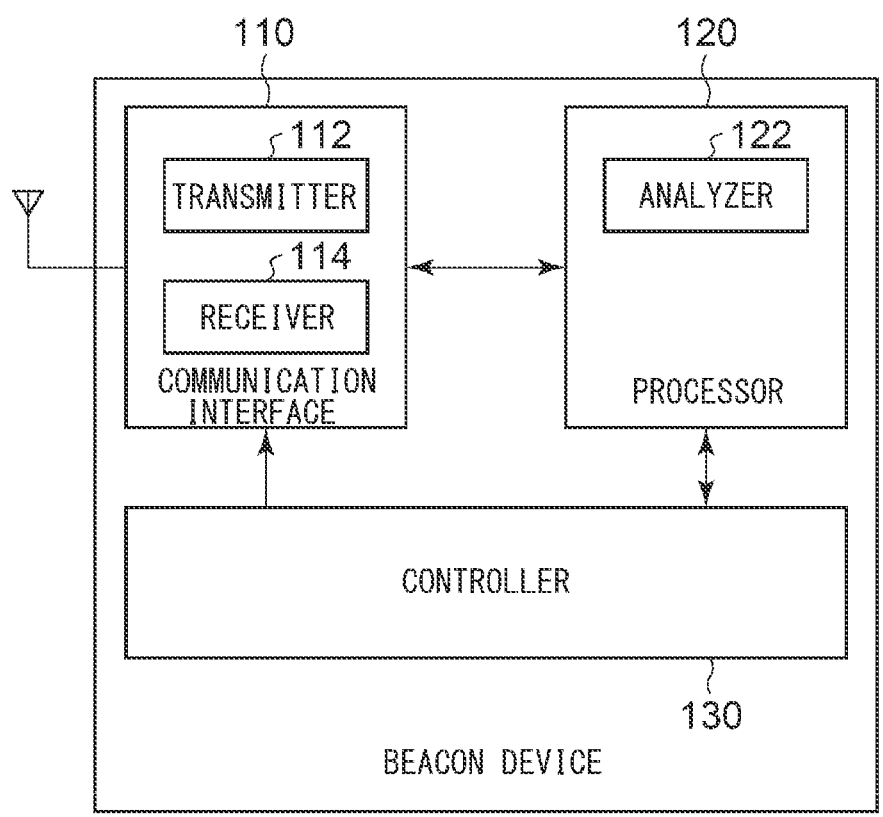
FIG. 3 is a diagram illustrating the configuration of a beacon device of FIG. 1.

FIGS. 2 and 3 are also used below to further explain the process in the positioning system 1000. FIG. 2 illustrates the configuration of the wireless device 200. The wireless device 200 includes a communication interface 210, a processor 220, and a detector 240, and the communication interface 210 includes a transmitter 212 and a receiver 214.

The communication interface 210 executes a wireless communication function using a short-range wireless communication system. The receiver 214 receives a beacon signal from a beacon device 100, and the transmitter 212 transmits the reception result to the sensor 300. The receiver 214 measures the reception power of the beacon signal. The processor 220 generates the reception result based on the beacon signal received by the receiver 214 and outputs the reception result to the transmitter 212.

Such a wireless device 200 is provided with an emergency function. The emergency function is a function that is used when the subject, who is the owner of the wireless device, is in an emergency situation, and that transmits a status code or the like to report the emergency state. The detector 240 detects an emergency situation. For example, the detector 240 detects an emergency situation when a button on the wireless device 200 is pressed down by the subject of the emergency situation. Also, as the emergency situation, activity detection when there is movement of the wireless device 200 or man down or stationary detection when there is no movement of the wireless device 200 is also detected. For such motion detection, the detector 240 includes an acceleration sensor. The acceleration sensor detects a case where there is movement of the wireless device 200 that occurs, e.g., when the wireless device 200 is violently shaken or when the subject runs while holding the wireless device 200 in his/her hand. Also, the acceleration sensor also detects a case where there is no movement of the wireless device 200, such as when the device is stationary for a certain period of time or when the angle of the wireless device 200 is tilted for a certain period of time or more.

When the detector 240 detects an emergency situation, the processor 220 generates an emergency signal indicating that there is an emergency situation. The emergency signal includes information indicating that the situation is an emergency situation, information indicating any one of activity detection, man down, and stationary detection, a beacon device ID included in the received beacon signal, and information identifying the wireless device 200 that has generated the emergency signal. The transmitter 212 transmits the emergency signal. When the emergency signal is received by the sensor 300, the emergency signal is forwarded to the positioning server 400. Further, the emergency signal can also be received by the beacon device 100. Additionally, the emergency signal may be received by another wireless device 200 (not shown). The other wireless device 200 determines in which direction the wireless device 200 in the emergency state exists based on the reception power value. Thus, the user of the other wireless device 200 can perform a rescue operation.

If the beacon signal transmission interval in the beacon device 100 is long, the beacon device ID included in the emergency signal may not be the latest one. In that case, the exact location of the subject who is in the emergency situation cannot be reported. In order to deal with this, the beacon device 100 performs the following process.

FIG. 3 shows the configuration of the beacon device 100. The beacon device 100 includes a communication interface 110, a processor 120, and a controller 130. The communication interface 110 includes a transmitter 112 and a receiver 114, and the processor 120 includes an analyzer 122. The transmitter 112 transmits a beacon signal. The receiver 114 is capable of receiving an emergency signal from the wireless device 200 when the transmitter 112 is not transmitting beacon signals. The beacon signal transmission interval and the beacon signal transmission power are controlled by the controller 130. This corresponds to the controlling of the reception interval of an emergency signal by the controller 130. For example, if the transmission interval of a beacon signal is 30 seconds, the transmission of a beacon signal (1 second), the reception of an emergency signal (29 seconds), and the transmission of a beacon signal (1 second) are repeated.

When the receiver 114 receives an emergency signal, the analyzer 122 analyzes the emergency signal. If the information included in the emergency signal indicates activity detection, the analyzer 122 determines that the wireless device 200 that has transmitted the emergency signal is determined to be in the first state where the movement is large. On the other hand, if the information included in the emergency signal indicates man down or stationary detection, the analyzer 122 determines that the wireless device 200 that has transmitted the emergency signal is determined to be in the second state where the movement is small.

Based on the result of the analysis by the analyzer 122, the controller 130 controls the transmission of a beacon signal from the transmitter 112. For example, the controller 130 switches at least one of the beacon signal transmission interval and the beacon signal transmission power based on the result of the analysis from the analyzer 122.

FIG. 4 illustrates a data structure of a table stored in the controller 130. When there is no reception of an emergency signal, the transmission power is set to the first transmission power and the transmission interval is set to the first transmission interval. When an emergency signal is received and the state is determined as the first state, the transmission power is set to the second transmission power and the transmission interval is set to the third transmission interval. When an emergency signal is received and the state is determined as the second state, the transmission power is set to the second transmission power and the transmission interval is set to the second transmission interval. In this case, the first transmission power is smaller than the second transmission power, the first transmission interval is longer than the second transmission interval, and the second transmission interval is longer than the third transmission interval. The figure is now referred back.

As described, changing the transmission power allows a beacon signal to be easily received by the wireless device 200. Further, the beacon signal transmission interval is shortened in order to respond to a quick movement during activity detection. By setting the transmission interval to be relatively long during man down or stationary detection, the current position can be found more accurately, and the battery runtime can be extended.

When the transmission power is changed as described above, it is necessary not to simply determine whether the distance between the beacon device 100 and the wireless device 200 is short or long based only on the magnitude of the reception power in the wireless device 200. Therefore, a transmission power value is included in the emergency signal. The transmission power value indicates the value of reception strength [dBm] measured at a distance of one meter from the beacon device 100. The reception power value also indicates the value of signal strength [dBm] at the time of the actual reception. For example, the processor 220 of the wireless device 200 derives a distance d as follows:

$$d=10^{((transmission\ power-reception\ power)/20)}$$

When the detector 240 of the wireless device 200 in FIG. 2 no longer detects an emergency situation, the transmitter 212 of the wireless device 200 stops transmitting an emergency signal. When the receiver 114 of the beacon device 100 in FIG. 3 no longer receives an emergency signal, the beacon device 100 brings the transmission power back to the first transmission power and the transmission interval back to the first transmission interval and transmits a beacon signal.

The configuration is implemented in hardware by any CPU of a computer, memory or other LSI's, and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

Figure 5:
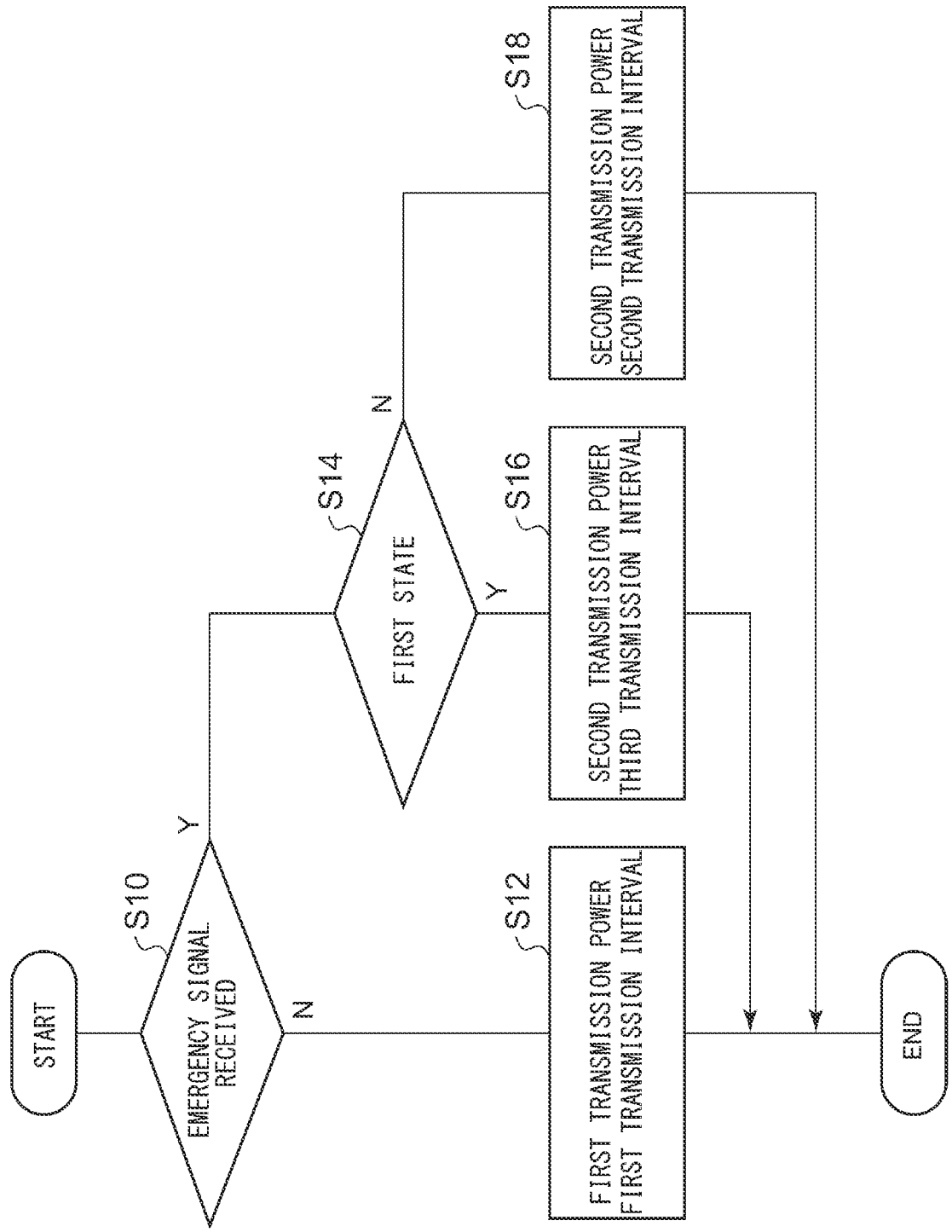
FIG. 5 is a flowchart illustrating the transmission procedure of a beacon signal performed by a beacon device of FIG. 2.

An explanation will be given of the operation of the positioning system 1000 having the above-stated configuration. FIG. 5 is a flowchart illustrating the transmission procedure of a beacon signal performed by a beacon device 100. When the receiver 114 does not receive an emergency signal (N in S10), the controller 130 sets the transmission power to the first transmission power and the transmission interval to the first transmission interval (S12). When the receiver 114 receives an emergency signal (Y in S10), the controller 130 sets the transmission power to the second transmission power and the transmission interval to the third transmission interval (S16) if the state is the first state. When the state is not the first state (N in S14), i.e., the second state, the controller 130 sets the transmission power to the second transmission power and the transmission interval to the second transmission interval (S18).

According to the exemplary embodiment, when an emergency signal is received, at least one of the beacon signal transmission interval and the beacon signal transmission power is switched based on the result of the analysis of the emergency signal, making it easier to receive beacon signals only when necessary. Further, since the reception of beacon signals is made easier only when necessary, beacon signals can be transmitted in a way that improves both maintainability and real-time performance. When the wireless device that has transmitted the emergency signal is in the first state with large movement, the beacon signal transmission interval is made shorter compared to the second state with small movement, making it easier to receive beacon signals when there is large movement. Further, when an emergency signal is received, the beacon signal transmission power is increased to be higher compared to the case where no emergency signal is received, making it easier to receive beacon signals in an emergency.

Second Exemplary Embodiment

Subsequently, a second exemplary embodiment will be described. Just like the first exemplary embodiment, the second exemplary embodiment also relates to a positioning system including a plurality of beacon devices, a wireless device, and a positioning server. Beacon devices according to the second exemplary embodiment change the beacon signal transmission power and the beacon signal transmission interval upon receiving a beacon signal from the wireless device. The beacon devices also transmit beacon signals for emergency state notification. In order to distinguish from the beacon signals for emergency state notification, the beacon signals described thus far are also called beacon signals for positioning. A positioning system 1000, a wireless device 200, and a beacon device 100 according to the second exemplary embodiment are of the same types as those in FIGS. 1 through 3. A description will be made mainly regarding the difference from the previous explanations.

Figure 6A:
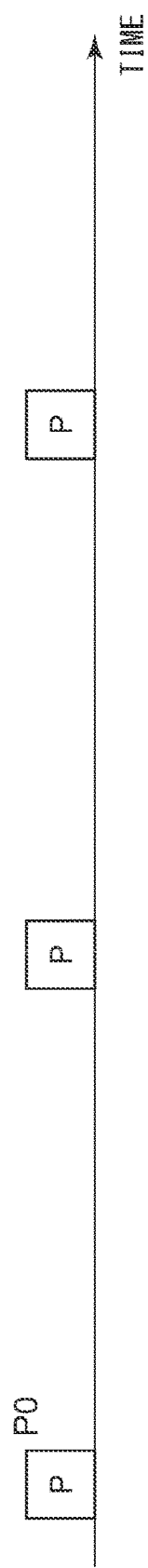
FIGS. 6A to 6B are diagrams illustrating an overview of the transmission of a beacon signal according to the second exemplary embodiment.
Figure 6B:
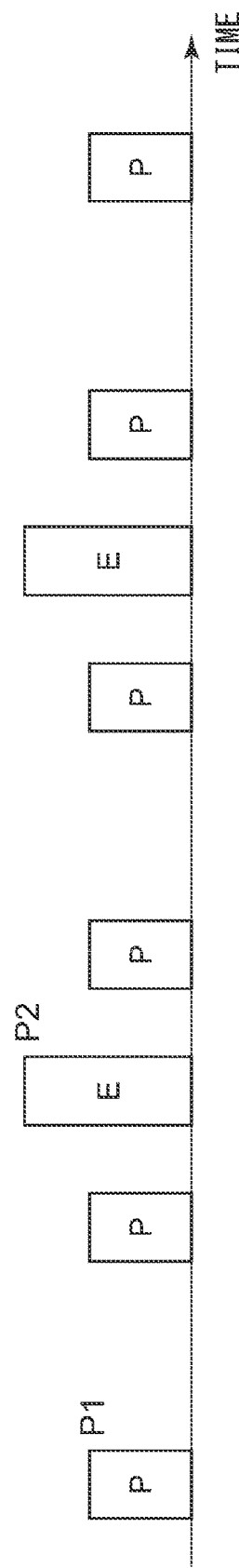

FIGS. 6A to 6B illustrate an overview of the transmission of a beacon signal. The horizontal axis indicates time. FIG. 6A shows operation when the receiver 114 of a beacon device 100 is not receiving an emergency signal from the wireless device 200. The beacon device 100 intermittently transmits beacon signals for positioning at a transmission power (P0). The beacon signals for positioning are indicated as "P". This is the same as in the first exemplary embodiment.

FIG. 6B shows operation when the receiver 114 of the beacon device 100 has received emergency signals from the wireless device 200. The beacon device 100 intermittently transmits beacon signals for positioning at a transmission power (P1). The beacon device 100 makes the transmission interval of beacon signals for positioning shorter than that in the case of FIG. 6A. P1 is larger than P0, but P1 may be P0. Further, the beacon device 100 intermittently transmits beacon signals for emergency state notification at transmission power (P2). The beacon signals for emergency state notification are indicated as "E". The beacon signals for emergency state notification include information regarding the wireless device 200 that has transmitted the received emergency signals, for example, the wireless device ID, status data indicating an emergency state, etc. P2 is larger than P1. The beacon signals for emergency state notification are received by, for example, another wireless device 200.

According to the present exemplary embodiment, when an emergency signal is received, beacon signals for emergency state notification that includes information regarding the wireless device that has transmitted the received emergency signal is transmitted intermittently in addition to beacon signals for positioning. Therefore, the beacon signals for emergency state notification can be transmitted only when necessary. Further, since beacon signals for emergency state notification are transmitted only when necessary, beacon signals can be transmitted in a way that improves both maintainability and real-time performance. Further, when an emergency signal is received, beacon signals for emergency state notification are transmitted at a higher transmission power than that for beacon signals for positioning. Thus, the reception of the beacon signals for emergency state notification can be made easier. Further, when an emergency signal is received, the transmission power for beacon signals for positioning is increased compared to the case where no emergency signal is received, making it easier to receive beacon signals for positioning in an emergency.

Described above is an explanation made based on an exemplary embodiment. These exemplary embodiments are intended to be illustrative only, and it will be obvious to those skilled in the art that various modifications to constituting elements and processes could be developed and that such modifications are also within the scope of the present invention.

In the first and second exemplary embodiments, a beacon device 100 changes the transmission power and the transmission interval upon receiving an emergency signal. However, this is non-limiting. For example, the beacon device 100 may change one of the transmission power and the transmission interval upon receiving an emergency signal. According to the present variation, the degree of freedom in the structure can be improved.

What is claimed is:

1. A beacon device comprising:
    a transmitter that transmits a beacon signal;
    a receiver that is capable of receiving an emergency signal from a wireless device;
    an analyzer that analyzes the emergency signal when the receiver receives the emergency signal; and
    a controller that controls the transmission of a beacon signal from the transmitter based on the result of the analysis, wherein
    the controller switches at least one of a beacon signal transmission interval and a beacon signal transmission power based on the result of the analysis from the analyzer.

2. The beacon device according to claim 1, wherein
    the analyzer determines whether the wireless device that has transmitted the emergency signal is in a first state where the movement is large or in a second state where the movement is small, and
    when the analyzer determines that the wireless device is in the first state, the controller sets the beacon signal transmission interval to be shorter than that in a case where the analyzer determines that the wireless device is in the second state.

3. The beacon device according to claim 1, wherein
    when the receiver receives the emergency signal, the controller increases the beacon signal transmission power to be larger than that in a case where the receiver does not receive an emergency signal.

4. The beacon device according to claim 2, wherein
    when the receiver receives the emergency signal, the controller increases the beacon signal transmission power to be larger than that in a case where the receiver does not receive an emergency signal.

5. A positioning system comprising:
    the beacon device according to claim 1;
    a wireless device that receives a beacon signal from the beacon device; and
    a positioning server that estimates the position of the wireless device based on the beacon signal received by the wireless device, wherein
    the wireless device incudes:
    a detector that detects an emergency situation; and
    a transmitter that transmits an emergency signal indicating that there is an emergency situation when the detector detects the emergency situation.

6. A beacon signal transmission method comprising:
    transmitting a beacon signal;
    when receiving an emergency signal from a wireless device, analyzing the emergency signal; and
    controlling the transmission of a beacon signal based on the result of the analysis, wherein
    in the controlling, at least one of a beacon signal transmission interval and a beacon signal transmission power is switched based on the result of the analysis.

7. A beacon device comprising:
a transmitter that transmits a beacon signal;
a receiver that is capable of receiving an emergency signal from a wireless device; and
a controller that controls the transmission of a beacon signal from the transmitter, wherein
the controller intermittently transmits a beacon signal for positioning when the receiver does not receive an emergency signal, and
when the receiver receives an emergency signal, the controller intermittently transmits a beacon signal for emergency state notification that includes information regarding the wireless device that has transmitted the received emergency signal in addition to a beacon signal for positioning.

8. The beacon device according to claim 7, wherein
the controller intermittently transmits a beacon signal for positioning at first transmission power when the receiver does not receive an emergency signal, and
the controller intermittently transmits a beacon signal for emergency state notification at second transmission power, which is larger than the first transmission power, in addition to a beacon signal for positioning when the receiver receives an emergency signal.

9. The beacon device according to claim 8, wherein
the controller intermittently transmits the beacon signal for positioning at first transmission power when the receiver does not receive an emergency signal,
the controller switches the transmission power of the beacon signal for positioning to a third transmission power when the receiver receives an emergency signal, and
the third transmission power is larger than the first transmission power and smaller than the second transmission power.

10. A positioning system comprising:
the beacon device according to claim 7;
a wireless device that receives a beacon signal from the beacon device; and
a positioning server that estimates the position of the wireless device based on the beacon signal received by the wireless device, wherein
the wireless device incudes:
a detector that detects an emergency situation; and
a transmitter that transmits an emergency signal indicating that there is an emergency situation when the detector detects the emergency situation.

* * * * *